US011200529B2

(12) United States Patent
Sekine

(10) Patent No.: US 11,200,529 B2
(45) Date of Patent: Dec. 14, 2021

(54) INFORMATION PROCESSING APPARATUS, INFORMATION PROCESSING SYSTEM, INFORMATION PROCESSING METHOD AND NON-TRANSITORY COMPUTER READABLE RECORDING MEDIUM

(71) Applicant: NS SOLUTIONS CORPORATION, Tokyo (JP)

(72) Inventor: Katsuyuki Sekine, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 633 days.

(21) Appl. No.: 15/735,901

(22) PCT Filed: May 31, 2016

(86) PCT No.: PCT/JP2016/066021
§ 371 (c)(1),
(2) Date: Dec. 12, 2017

(87) PCT Pub. No.: WO2017/022312
PCT Pub. Date: Feb. 9, 2017

(65) Prior Publication Data
US 2019/0005433 A1 Jan. 3, 2019

(30) Foreign Application Priority Data
Aug. 6, 2015 (JP) .............................. JP2015-156179

(51) Int. Cl.
*G06Q 10/06* (2012.01)
*G06F 11/07* (2006.01)
(Continued)

(52) U.S. Cl.
CPC ... *G06Q 10/06398* (2013.01); *G05B 23/0235* (2013.01); *G06F 11/0754* (2013.01);
(Continued)

(58) Field of Classification Search
CPC ................................................. G06Q 10/06398
(Continued)

(56) References Cited

U.S. PATENT DOCUMENTS 8,645,769 B2 * 2/2014 Hasegawa ............. G06F 11/079
714/48
9,741,230 B2 * 8/2017 Matsumoto ........ G05B 23/0254
(Continued)

FOREIGN PATENT DOCUMENTS

JP 2009-199533 A 9/2009
JP 2015-096831 A 5/2015
(Continued)

OTHER PUBLICATIONS

International Search Report issued in related WIPO Patent Application No. PCT/JP2016/066021 dated Jul. 19, 2016.
(Continued)

*Primary Examiner* — Folashade Anderson
(74) *Attorney, Agent, or Firm* — Arent Fox LLP

(57) ABSTRACT

The present invention includes: a first divider that divides time series data measured at a normal time into periodic data in period units; a reference data generator that generates reference data based on a plurality of pieces of periodic data; an allowable error calculator that calculates an allowable error of a divergence value, based on the time series data of the normal time and the reference data the divergence value indicates a degree of divergence from the reference data; a divergence value calculator that calculates a divergence value between time series data for detection, the time series data for detection is a detection object for detection of a non-normal state; and a detector that detects the non-normal state in accordance with whether or not the divergence value is within a range of allowable errors.

16 Claims, 11 Drawing Sheets

(51) Int. Cl.
*G05B 23/02* (2006.01)
*G06F 16/22* (2019.01)

(52) U.S. Cl.
CPC .............. *G06F 16/2291* (2019.01); *G05B 2219/45014* (2013.01); *G06F 2201/81* (2013.01)

(58) Field of Classification Search
USPC .......................................... 705/7.42
See application file for complete search history.

(56) References Cited

U.S. PATENT DOCUMENTS

| | | | | |
|---|---|---|---|---|
| 2002/0173935 A1* | 11/2002 | Miura | .............. | G05B 19/41875 702/182 |
| 2009/0217099 A1 | 8/2009 | Kato | | |
| 2011/0225462 A1 | 9/2011 | Kato | | |
| 2012/0192014 A1 | 7/2012 | Kato | | |
| 2013/0110409 A1* | 5/2013 | Sakurada | ............... | G16B 99/00 702/19 |
| 2013/0304419 A1* | 11/2013 | Nakamura | .............. | G03F 7/162 702/183 |
| 2014/0365829 A1* | 12/2014 | Higuchi | | |
| 2016/0056064 A1* | 2/2016 | Miki | ................ | H01L 21/67288 702/182 |
| 2016/0076970 A1 | 3/2016 | Takahashi | | |
| 2016/0132373 A1 | 3/2016 | Yoshinaga et al. | | |
| 2020/0245902 A1* | 8/2020 | Sano | .................... | A61B 5/4082 |

FOREIGN PATENT DOCUMENTS

| | | |
|---|---|---|
| JP | 2016-62258 A | 4/2016 |
| TW | 201245909 A1 | 11/2012 |
| WO | WO 2013/042789 A1 | 3/2013 |
| WO | WO 2014/208002 A1 | 12/2014 |

OTHER PUBLICATIONS

Zhao Xiaojun, The Correlation and Complexity Analysis of Time Series, Full-text Database of Chinese Doctoral Dissertations (Basic Science Series), Beijing Jiaotong University, No. 06, A002-1, 118 Pages Total, (2015).

Communication from the State Intellectual Property Office of People's Republic of China in counterpart Application No. 201680034157.3, dated Jan. 14, 2020.

* cited by examiner

FIG.5A
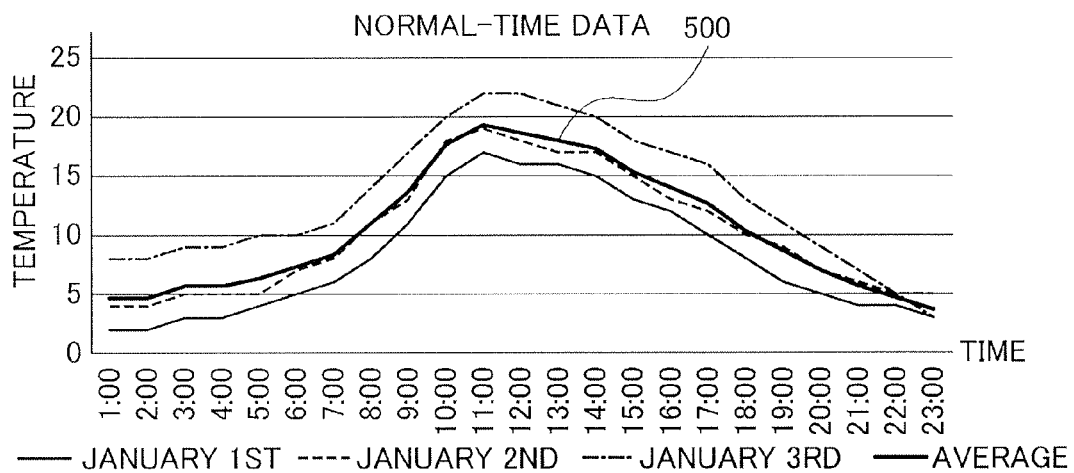
NORMAL-TIME DATA 500
— JANUARY 1ST  ---- JANUARY 2ND  --- JANUARY 3RD  — AVERAGE
FIG.5B
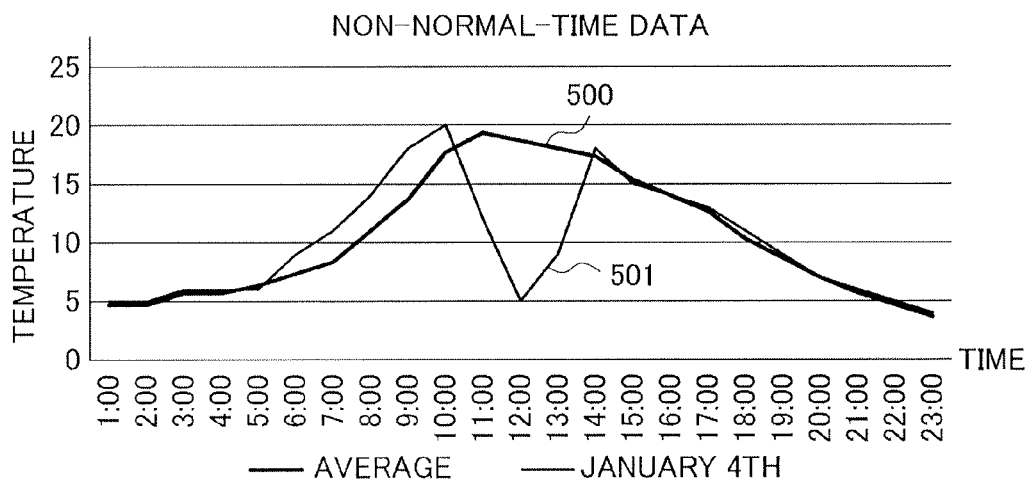
NON-NORMAL-TIME DATA
— AVERAGE    — JANUARY 4TH
FIG.5C
|  | JANUARY 1ST | JANUARY 2ND | JANUARY 3RD | JANUARY 4TH |
|---|---|---|---|---|
| CORRELATION COEFFICIENT | 0.994 | 0.9941 | 0.9852 | 0.684 |
| TOTAL SUM OF DIFFERENCES | 52.333 | 12.667 | 61 | 49 |
| INTER-DATA DISTANCE | −52.33 | −7.333 | 59.667 | −12.33 |
NORMAL-TIME DATA    NON-NORMAL-TIME DATA 501

FIG.6A
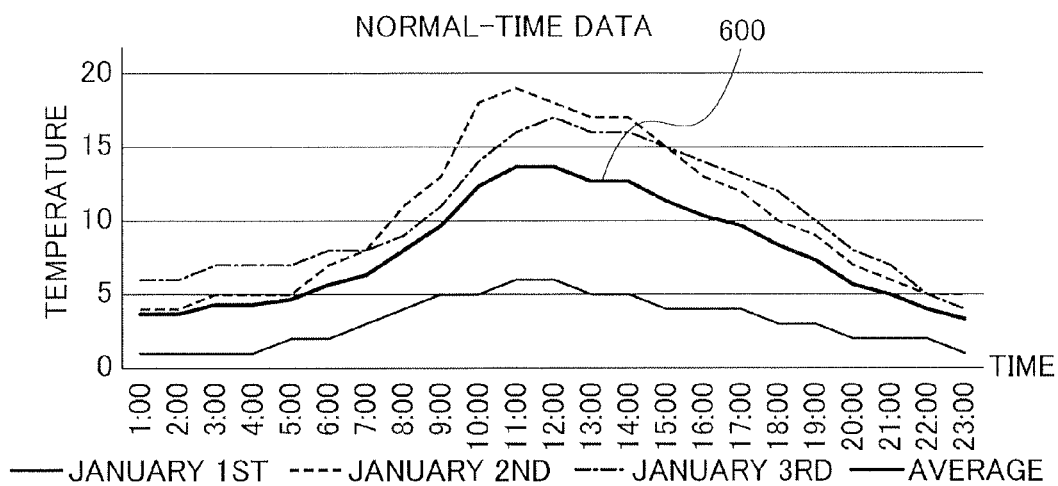
NORMAL-TIME DATA
— JANUARY 1ST    ---- JANUARY 2ND    —·— JANUARY 3RD    — AVERAGE
FIG.6B
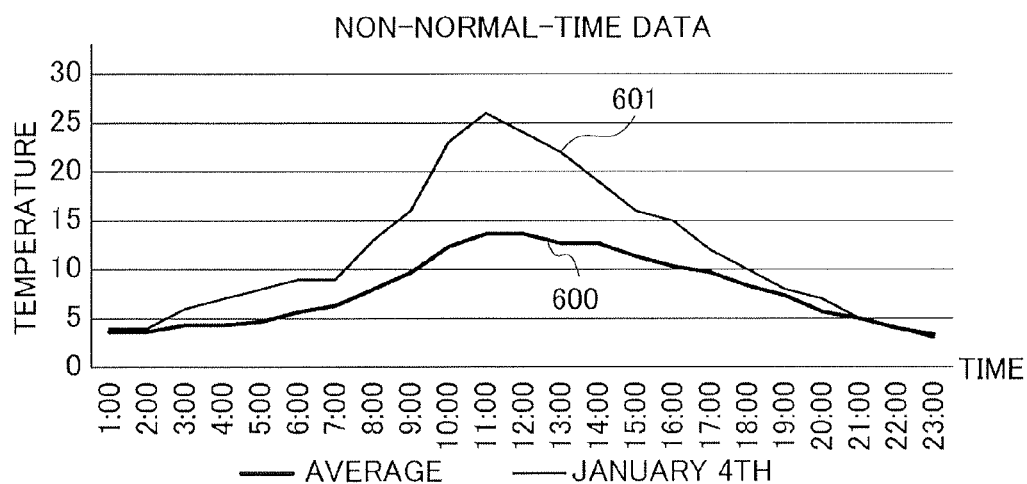
NON-NORMAL-TIME DATA
— AVERAGE    — JANUARY 4TH
FIG.6C
|  | JANUARY 1ST | JANUARY 2ND | JANUARY 3RD | JANUARY 4TH |
|---|---|---|---|---|
| CORRELATION COEFFICIENT | 0.9649 | 0.9938 | 0.9808 | 0.9668 |
| TOTAL SUM OF DIFFERENCES | −108.3 | 52.667 | 55.667 | 89.67 |
| INTER-DATA DISTANCE | 108.33 | 52.667 | 55.667 | 90.333 |
NORMAL-TIME DATA (JANUARY 1ST–3RD)    NON-NORMAL-TIME DATA 601 (JANUARY 4TH)

FIG.7A
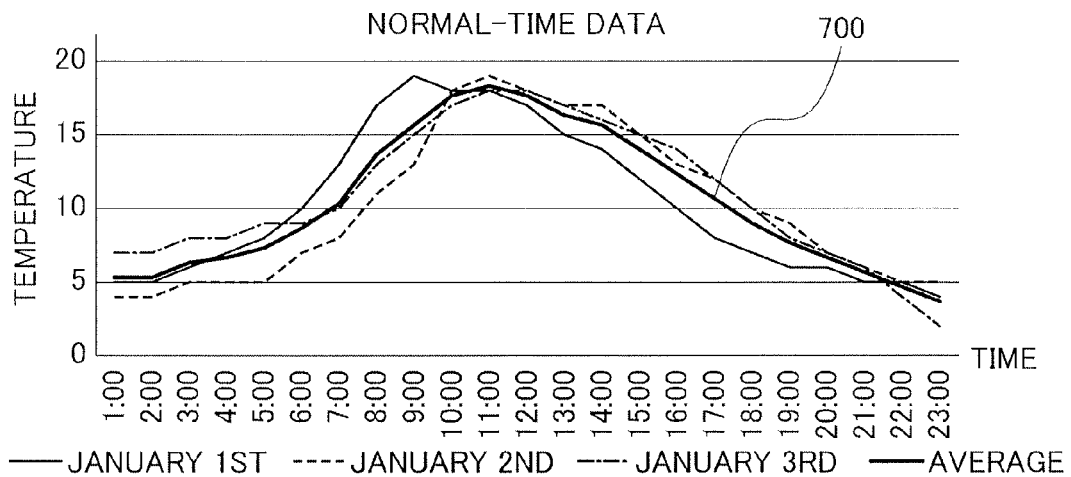
FIG.7B
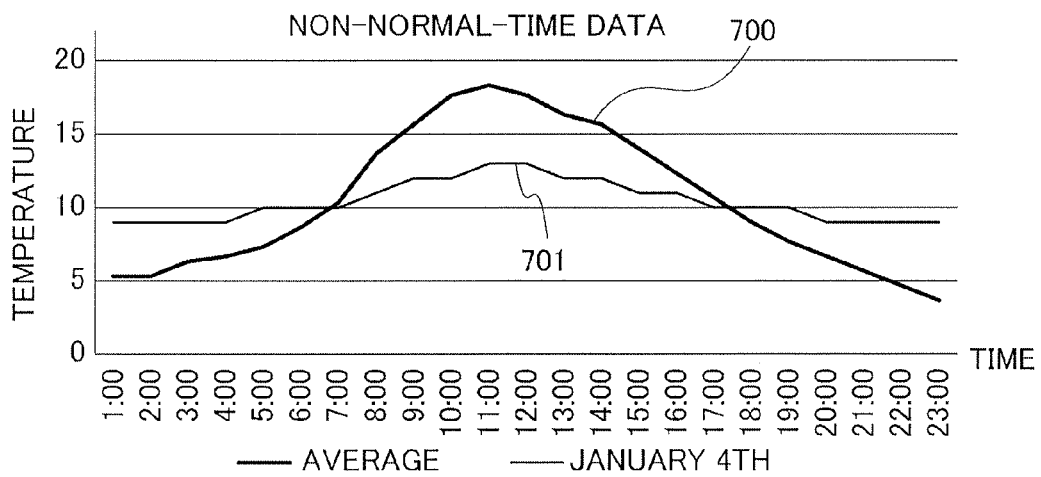
FIG.7C
|  | JANUARY 1ST | JANUARY 2ND | JANUARY 3RD | JANUARY 4TH |
|---|---|---|---|---|
| CORRELATION COEFFICIENT | 0.9451 | 0.9616 | 0.9796 | 0.9721 |
| TOTAL SUM OF DIFFERENCES | -4.333 | -6.333 | 10.667 | -0.333 |
| INTER-DATA DISTANCE | 29.667 | 28.333 | 20.667 | 70.33 |
NORMAL-TIME DATA    NON-NORMAL-TIME DATA 701

INFORMATION PROCESSING APPARATUS, INFORMATION PROCESSING SYSTEM, INFORMATION PROCESSING METHOD AND NON-TRANSITORY COMPUTER READABLE RECORDING MEDIUM

CROSS-REFERENCE TO RELATED APPLICATIONS

This application is a National Stage entry of International Application No.: PCT/JP2016/066021, filed May 31, 2016, which claims priority to Japanese Patent Application No. 2015-156179, filed Aug. 6, 2015. The disclosures of the priority applications are hereby incorporated in their entirety by reference herein.

TECHNICAL FIELD

The present invention relates to an information processing apparatus, an information processing system, an information processing method and a computer readable non-transitory recording medium.

BACKGROUND ART

Technology is already known that detects an abnormality based on various kinds of signals obtained from equipment in a plant or the like. According to such technology, a determination as to whether or not there is an abnormality is generally made based on whether or not a value of a signal obtained from equipment or the like is higher than a threshold value that a veteran worker or the like set on the basis of many years of experience and intuition. Technology is also known that detects abnormalities using a method referred to as so-called "invariant analysis" (see Patent Literature 1 and Patent Literature 2). In brief, invariant analysis is a method that models an invariant relation between a plurality of monitoring targets, and determines that an abnormality has occurred in a case where the invariant relation breaks down in the data that is being monitored.

CITATION LIST

Patent Literature

Patent Literature 1: International Publication Pamphlet No. WO 2013/042789
Patent Literature 2: Japanese Laid-open Patent Publication No. 2009-199533

SUMMARY OF INVENTION

Technical Problem

However, the following problems exist in the conventional technology. First, in a situation where the existence of abnormalities is determined based on whether or not a threshold value set by a veteran worker or the like based on many years of experience and intuition is exceeded, there is a problem of difficulty in setting of the threshold value when the veteran worker no longer works in the company due to retirement or the like. Further, in the case of using invariant analysis, there arises a problem in that the system configuration is complicated and becomes large in scale, and since it is necessary to define relations between a plurality of pieces of data in advance, the setting work becomes complex and cannot be easily mastered.

The present invention has been made in consideration of the above described problems, and an object of the present invention is to detect a non-normal state that is different from a normal state by data analysis without performing complicated processing.

Solution to Problem

The present invention is an information processing apparatus including: a first divider configured to divide time series data measured at a normal time into periodic data in a period unit; a reference data generator configured to generate reference data based on a plurality of pieces of periodic data; an allowable error calculator configured to calculate an allowable error of a divergence value, based on the time series data of the normal time and the reference data, the divergence value indicates a degree of divergence from the reference data; a divergence value calculator configured to calculate a divergence value between time series data for detection and the reference data, the time series data for detection is a detection object for detection of a non-normal state; and a detector configured to detect the non-normal state in accordance with whether or not the divergence value is within a range of the allowable error.

Advantageous Effects of Invention

According to the present invention, a non-normal state that is different from a normal state can be detected by data analysis without performing complicated processing.

BRIEF DESCRIPTION OF DRAWINGS

FIG. 5A is an explanatory diagram for describing a correlation coefficient.
FIG. 5B is an explanatory diagram for describing a correlation coefficient.
FIG. 5C is an explanatory diagram for describing a correlation coefficient.
FIG. 6A is an explanatory diagram for describing a total sum of differences.
FIG. 6B is an explanatory diagram for describing a total sum of differences.
FIG. 6C is an explanatory diagram for describing a total sum of differences.
FIG. 7A is an explanatory diagram for describing an inter-data distance.
FIG. 7B is an explanatory diagram for describing an inter-data distance.
FIG. 7C is an explanatory diagram for describing an inter-data distance.

DESCRIPTION OF EMBODIMENTS

Hereunder, embodiments of the present invention are described based on the accompanying drawings.

Figure 1:
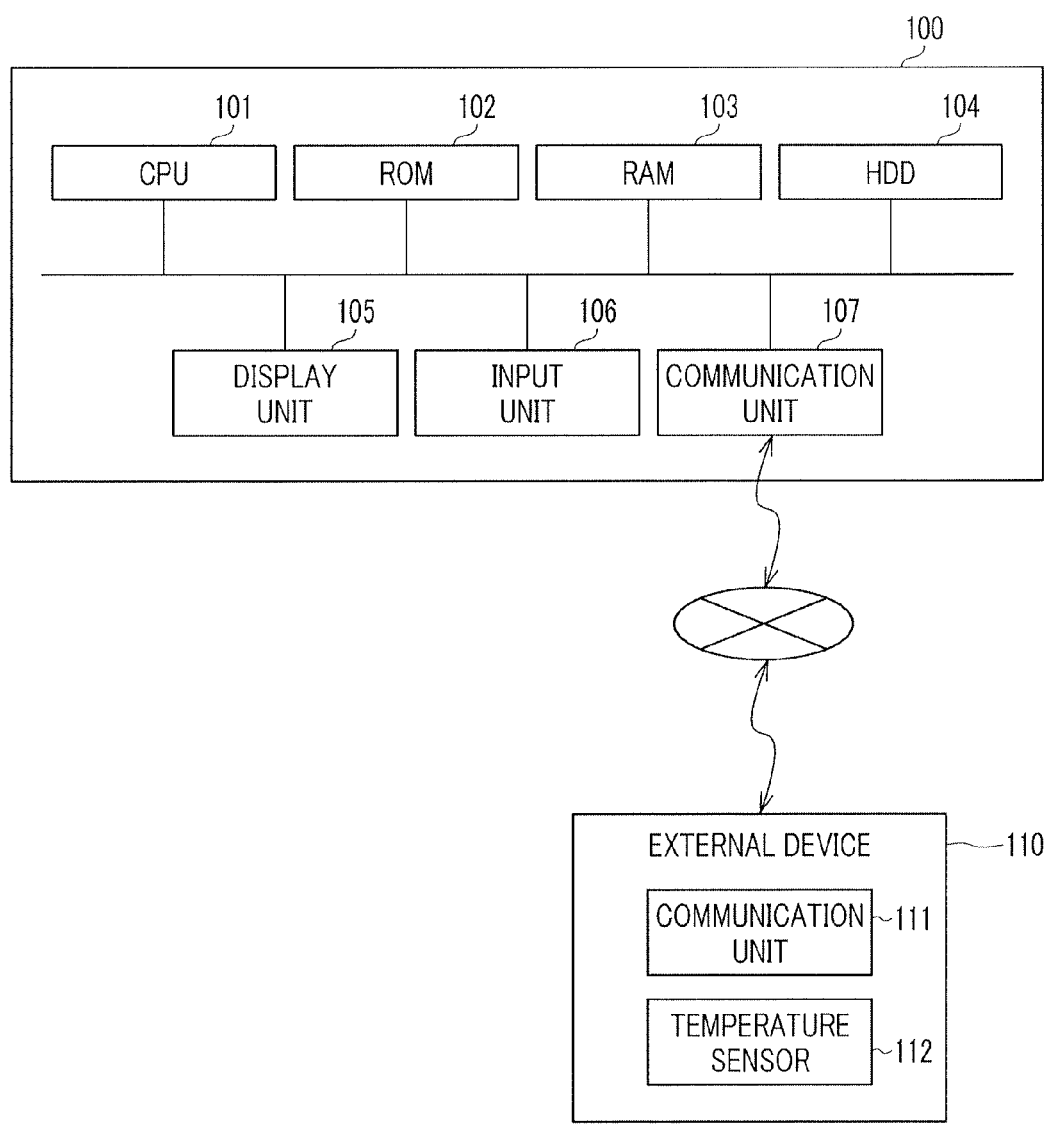
FIG. 1 is a view illustrating the overall configuration of a non-normal-state detection system.

FIG. 1 is a view illustrating the overall configuration of a non-normal-state detection system according to the present embodiment. The non-normal-state detection system according to the present embodiment monitors temperature changes in an external device 110, and detects when the state of the external device 110 or the surrounding environment becomes a non-normal state that is different from a normal state based on a temperature change. Here, the term "normal state" refers to, for example, a state in which the external device 10 is normally operating or a state of the surrounding environment in which the external device 10 can maintain stable operation. Further, the term "non-normal state" refers to a state that is different from a normal time, for example, a state in which an abnormality such as an abrupt increase in temperature occurred in the external device 110, or a state in which a sign is detected that is linked to an abnormality of the external device 110, including the state of the surrounding environment. Further, although time series data of temperature changes is adopted as the detection object in the present embodiment, the detection object is not limited to time series data of temperature changes, and may be other data as long as the data is measurement data for which a value changes over time. Waveform data of a sound that a motor emits may be mentioned as another example of the detection object. In such a case, the non-normal-state detection system detects the external device 110 entering a non-normal state based on a change in the waveform data.

The external device 110 has a temperature sensor 112 and a communication unit 111. The temperature sensor 112 measures the temperature of the external device 110. The temperature sensor 112, for example, measures a temperature at one-minute intervals. The communication unit 111 transmits time series data showing temperature changes obtained as a result of measurement by the temperature sensor 112 to an information processing apparatus 100 through a network.

The information processing apparatus 100 has a CPU 101, a ROM 102, a RAM 103, a HDD 104, a display unit 105, an input unit 106 and a communication unit 107. The CPU 101 reads out a control program stored in the ROM 102 and executes various kinds of processing. The RAM 103 is used as a temporary storage area such as a work area and a main memory of the CPU 101. The HDD 104 stores various kinds of information such as image data and various programs. The display unit 105 displays various kinds of information. The input unit 106 has a keyboard and a mouse, and accepts various operations performed by a user. The communication unit 107 conducts communication with the external device 110.

Figure 2:
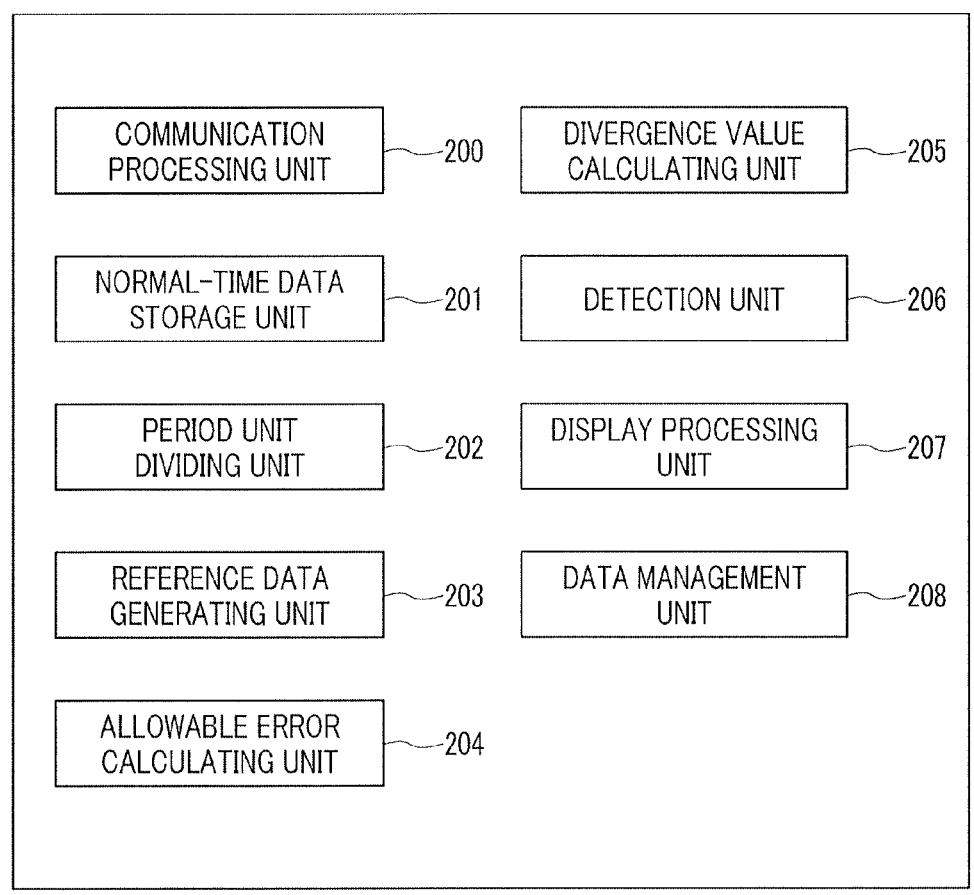
FIG. 2 is a functional block diagram of an information processing apparatus.

FIG. 2 is a functional block diagram of the information processing apparatus 100. The information processing apparatus 100 has a communication processing unit 200, a normal-time data storage unit 201, a period unit dividing unit 202, a reference data generating unit 203, an allowable error calculating unit 204, a divergence value calculating unit 205, a detection unit 206, a display processing unit 207 and a data management unit 208.

The communication processing unit 200 receives time series data of temperature changes from the external device 110 through the communication unit 107. The normal-time data storage unit 201 stores normal-time data. Here, the term "normal-time data" refers to time series data of temperature changes measured at a normal time. More specifically, the term "normal-time data" refers to time series data of temperature changes measured at a time at which the external device 110 was normally operating and with respect to which it is known the state was a normal state. In the present embodiment, the normal-time data storage unit 201 stores normal-time data that the communication processing unit 200 acquired from the external device 110. The period unit dividing unit 202 divides normal-time data into data in period units. Hereunder, data in period units is referred to as "periodic data".

The reference data generating unit 203 generates reference data based on a plurality of pieces of periodic data obtained from normal-time data. Here, the term "reference data" refers to standard periodic data that represents a plurality of pieces of periodic data. The allowable error calculating unit 204 calculates an allowable error of a divergence value that indicates a degree of divergence from the reference data of the time series data that is a detection object for detecting a non-normal state. Here, the term "allowable error" refers to a range of allowable divergence values with respect to the time series data that is the detection object. The allowable error calculating unit 204 calculates an allowable error based on normal-time data and reference data. Hereunder, the time series data that is the detection object is referred to as "detection object data".

The divergence value calculating unit 205 calculates the divergence value based on a value of the time series data that is the detection object and the reference data. The detection unit 206 detects a non-normal state with respect to the time series data that is the detection object based on the divergence value and the allowable error. The display processing unit 207 displays various kinds of information on the display unit 105. The display processing unit 207, for example, displays a detection result in a case where a non-normal state is detected. The data management unit 208 manages normal-time data, such as updating of normal-time data in the normal-time data storage unit 201.

Figure 3:
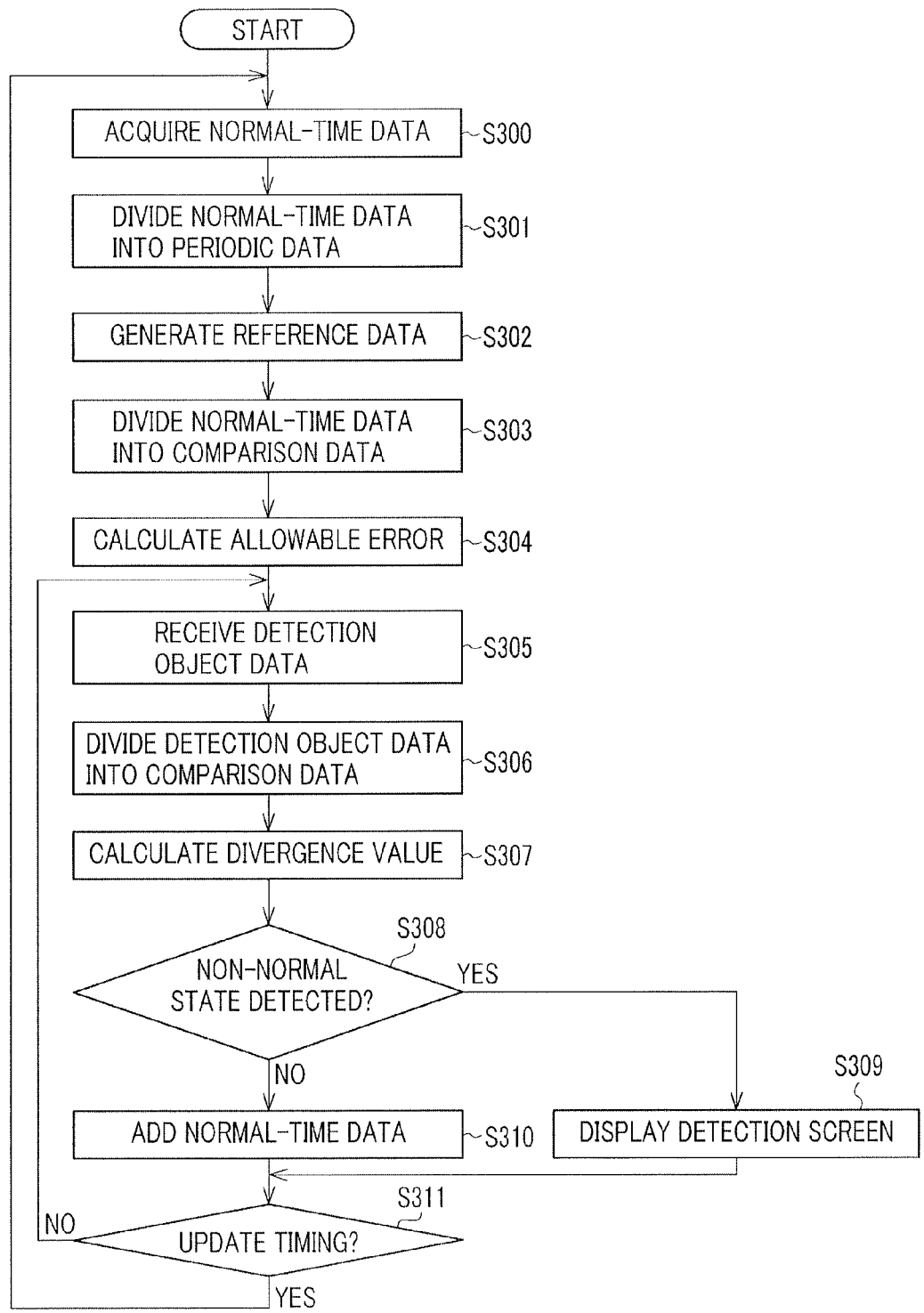
FIG. 3 is a flowchart illustrating non-normal-state detection processing.
Figure 4A:
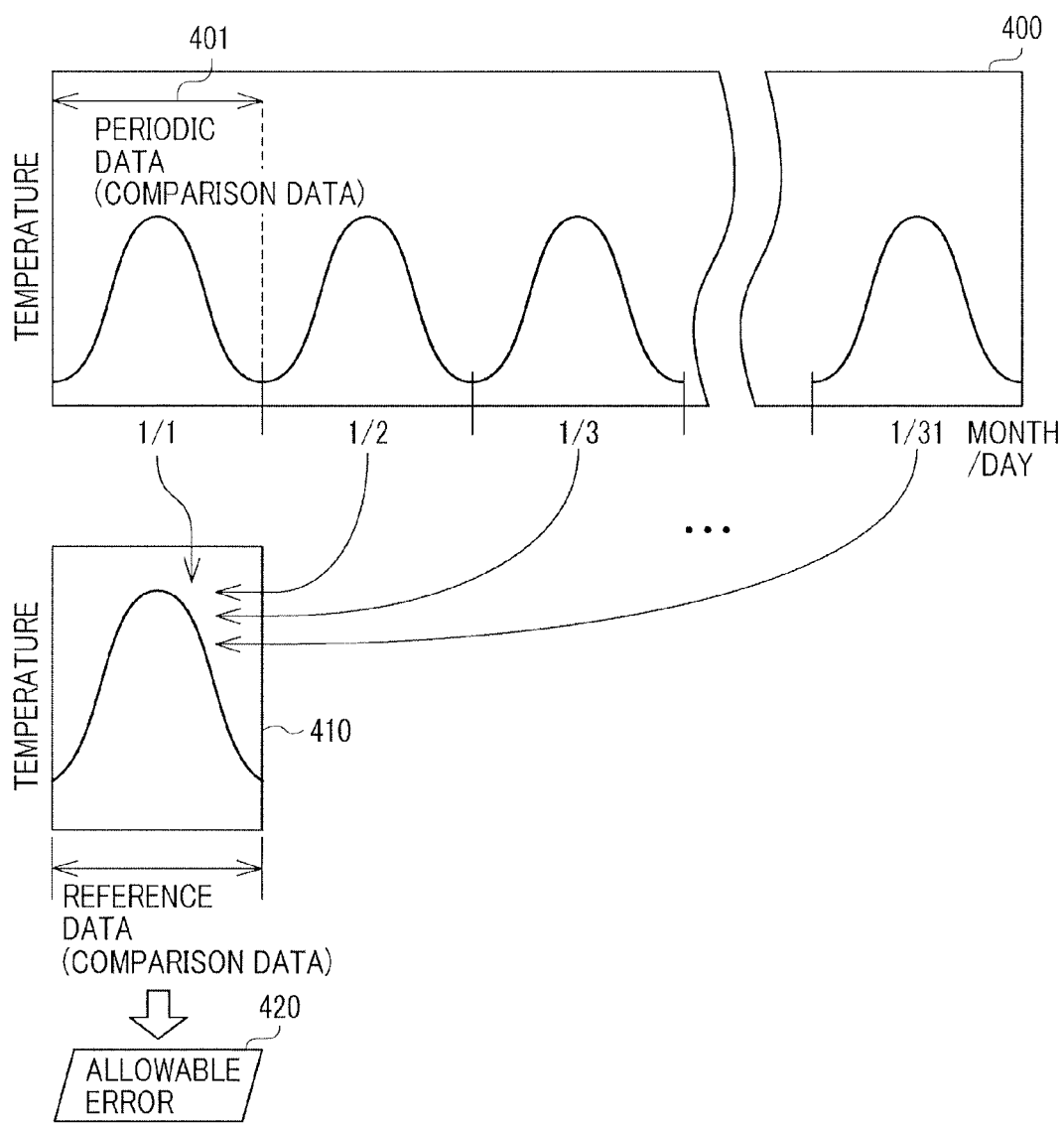
FIG. 4A is an explanatory diagram for describing non-normal-state detection processing.
Figure 4B:
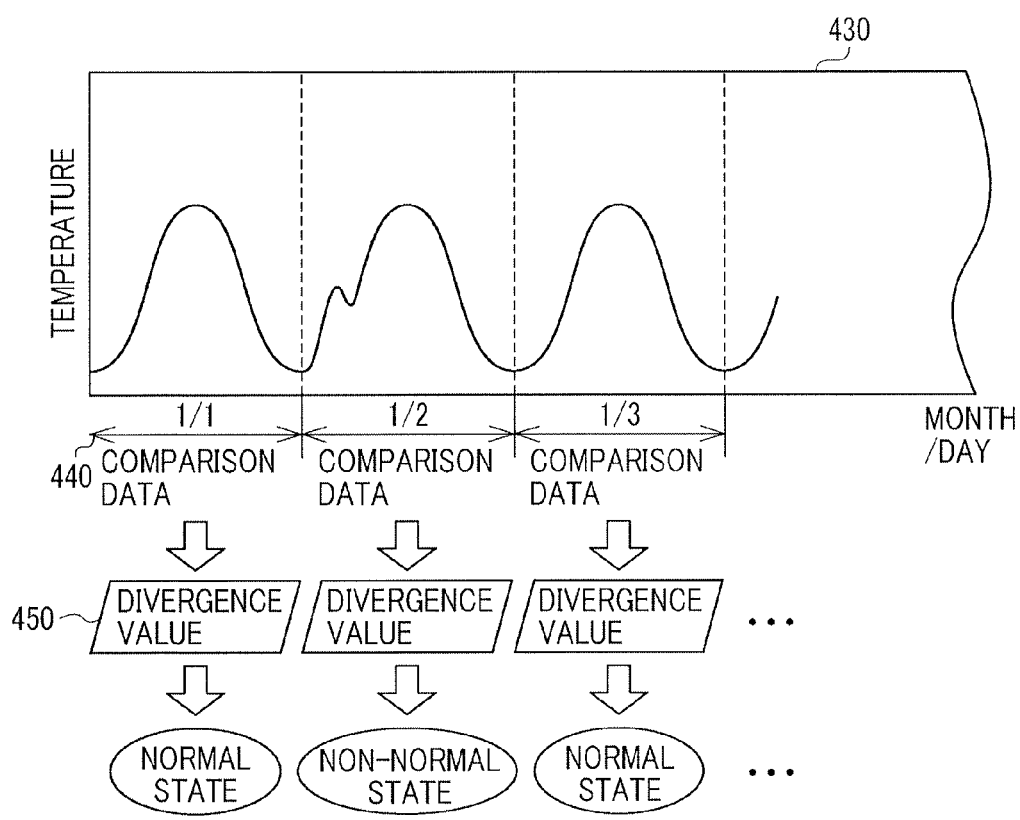
FIG. 4B is an explanatory diagram for describing non-normal-state detection processing.

FIG. 3 is a flowchart illustrating non-normal-state detection processing executed by the information processing apparatus 100. FIG. 4A and FIG. 4B are explanatory diagrams for describing non-normal-state detection processing. In S300, the period unit dividing unit 202 acquires normal-time data from the normal-time data storage unit 201. Next, in S301, the period unit dividing unit 202 determines a period unit by auto-correlation analysis (period unit determination processing). The period unit dividing unit 202 then divides the normal-time data into periodic data in the determined period units (dividing processing). Note that, as another example, the user may set period units through the input unit 106. In this case, the period unit dividing unit 202 may divide the periodic data for each period that is set in advance by the user and stored in the HDD 104 or the like.

FIG. 4A is a view illustrating one example of normal-time data 400. Consider that time series data for 30 days that shows temperature changes when taking one day as one period is obtained as the normal-time data 400. In this case, in S301, the period unit dividing unit 202 divides the normal-time data 400 into periodic data 401 on a single-day basis, as illustrated in FIG. 4A.

Returning to FIG. 3, after the processing in S301, in S302 the reference data generating unit 203 generates reference data from a plurality of pieces of periodic data obtained in S301 (reference data generating processing). Specifically, as the reference data, the reference data generating unit 203 generates average value data with respect to the plurality of pieces of periodic data. At this time, the reference data generating unit 203 may calculate an average value after performing a correction, such as removing singular points, with respect to each piece of periodic data. Further, as another example, as the reference data, the reference data generating unit 203 may generate data showing a median value or a highest frequency value of the plurality of pieces of periodic data. Reference data 410 is generated from the plurality of pieces of periodic data 401 shown in FIG. 4A. Note that, as long as the reference data generating unit 203 generates, as reference data, standard data representing a plurality of pieces of periodic data based on a plurality of pieces of periodic data, the specific processing for generating the reference data and the kind of reference data are not limited to the processing and kind of reference data described in the present embodiment.

Next, in S303, the allowable error calculating unit 204 divides the normal-time data and the reference data into data in comparison units, respectively. Hereunder, the normal-time data and the reference data in comparison units are each referred to as "comparison data". The comparison data is utilized when calculating an allowable error. Note that, the comparison units are set by the user through the input unit 106, and the user can set a unit that is less than or equal to a period unit as a comparison unit. In the present embodiment, it is assumed that the comparison unit is set as a single day similarly to the period unit, and the allowable error calculating unit 204 divides the normal-time data into comparison data 401 in single-day units as illustrated in FIG. 4A. Further, because the reference data 410 is data in single-day units, dividing is not required. In a case where the comparison unit and the period unit are equal, instead of dividing the normal-time data, the allowable error calculating unit 204 may acquire a plurality of pieces of periodic data obtained by division from the period unit dividing unit 202.

Next, in S304, the allowable error calculating unit 204 calculates an allowable error based on the comparison data of the periodic data obtained in S303 and the comparison data of the reference data that corresponds thereto (allowable error calculation processing). A correlation coefficient, a total sum of differences of the reference data, a distance between the reference data and the comparison data, and a combination of these three indices may be mentioned as indices of an allowable error. Hereunder, the total sum of differences of the reference data, and a distance between the reference data and the comparison data are referred to simply as "total sum of differences" and "inter-data distance", respectively.

In this case, the correlation coefficient is a value calculated by (formula 1) when it is given that a data string [(xi, yi)] is (i=1, 2, . . . , n), and takes a value from "−1" to "1". A correlation coefficient of means that the correlation is maximum, and a correlation coefficient of "−1" means that the correlation is minimum.

[Expression 1]

$$\frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$ (FORMURA 1)

Where,

[Expression 2]

$\bar{x}, \bar{y}$ are arithmetic averages of data x=[xi], y=[yi], respectively. This is a cosine of an angle formed by vectors $$x - \bar{x} = (x_1 - \bar{x}, \ldots, x_n - \bar{x}),$$

$$y - \bar{y} = (y_1 - \bar{y}, \ldots, y_n - \bar{y})$$ [Expression 3]

which represent a deviation from the average of each data. The correlation coefficient evaluates the similarity of the shape of the data overall, and not the similarity of the values of the respective points. Therefore, the correlation coefficient is suitable for detecting a non-normal state in which a change appears in the shape of data, such as an abrupt temperature decrease when the temperature is trending upward.

Note that, although the correlation coefficient calculated by (formula 1) is generally referred to as "Pearson's product-moment correlation coefficient", the correlation coefficient is not limited thereto, and for example, "Spearman's rank correlation coefficient" may be used. If "Spearman's rank correlation coefficient" is used, for example, in the case of temperature, when temperature changes are biased (that is, do not become a normal distribution) even in a normal state, the accuracy can be further improved by using a rank correlation coefficient that compares temperatures according to rank order (for example, the hottest temperature in one day) and not according to numerical values (for example, 25° C.).

Further, the total sum of differences is suitable for detecting a non-normal state in which the overall data significantly leans toward the positive direction or the negative direction. Furthermore, the inter-data distance is suitable for detecting a non-normal state in which the amplitude of the data changes. In the information processing apparatus 100, an index suitable to time series data of the detection object is set in advance as an index for an allowable error and a divergence value. As another example, a configuration may be adopted in which a plurality of indices are set in advance in the information processing apparatus 100, and an index to be used for the detection object is selected from among the plurality of indices in accordance with a user instruction. In this case, the allowable error calculating unit 204 and the divergence value calculating unit 205 calculate an allowable error and a divergence value for the selected index, respectively. Note that, in the present embodiment a case is described in which a correlation coefficient is set as the index.

In S304, the allowable error calculating unit 204 calculates correlation coefficients between each of a plurality of pieces of comparison data and reference data in comparison units, and determines a smallest value among the resulting values as the maximum value of an allowable error. The allowable error calculating unit 204 also calculates a total sum of differences between each of the plurality of pieces of comparison data and the reference data in comparison units, and determines a range from the largest value to the smallest value of the total sum of differences as the allowable error range. The allowable error calculating unit 204 also calculates an inter-data distance between each of the plurality of pieces of comparison data and the reference data in comparison units, and determines a largest value among the resulting values as the maximum value of an allowable error. Thus, the allowable error calculating unit 204 calculates an allowable error based on normal-time data and reference data. Thereby, as illustrated in FIG. 4A, a single allowable error 420 is calculated with respect to a single piece of reference data 410.

Next, in S305, the communication processing unit 200 receives time series data as the detection object, that is, detection object data, from the external device 110. Next, in S306, the divergence value calculating unit 205 divides the detection object data into comparison data in comparison units. FIG. 4B is a view illustrating detection object data 430. In the example in FIG. 4B, the detection object data 430 is divided into comparison data 440 in single-day units. Next, in S307, the divergence value calculating unit 205 calculates divergence values between the comparison data obtained in S306 and the reference data in comparison units (divergence value calculation processing). In the present embodiment, the divergence value calculating unit 205 calculates a correlation coefficient as the divergence value. Thus, the divergence value is made the same index as the allowable error. Thereby, as illustrated in FIG. 4B, a plurality of divergence values 450 corresponding to the plurality of pieces of comparison data 440 are calculated.

Next, in S308, the detection unit 206 detects for a non-normal state based on whether or not the divergence value is within the allowable error range (detection processing). Specifically, the detection unit 206 detects a non-normal state if the divergence value exceeds the allowable error range. In this case, the allowable error range is a range of values equal to or less than the maximum value of the allowable error calculated in S304. Note that, as long as the detection unit 206 detects for a non-normal state based on a divergence value and an allowable error range, the specific processing executed for that purpose is not limited to the processing described in the present embodiment. As another example, the detection unit 206 may determine that a non-normal state is detected in a case where a predetermined number, which is equal to or greater than two, of divergence values calculated in correspondence with consecutive comparison data exceed the allowable error range in succession.

As illustrated in FIG. 4B, the detection unit 206 performs detection for a non-normal state in comparison data units of the detection object data. In other words, in a case where the units of comparison data are set to small units, detection for a non-normal state can be performed at a time point at which only time series data for a relatively short period of time is obtained. If the detection unit 206 detects a non-normal state (Yes in S308), the processing advances to S309. If the detection unit 206 does not detect a non-normal state (No in S308), the processing advances to S310.

In S309, the display processing unit 207 displays a detection screen for notifying the user of the fact that a non-normal state was detected on the display unit 105, and thereafter the processing advances to S311. On the other hand, in S310, the detection object data with respect to which a non-normal state was not detected is added to and recorded in the normal-time data storage unit 201 as normal-time data by the data management unit 208, and thereafter the processing advances to S311.

In S311, in accordance with an updating condition, the CPU 101 determines whether or not the current timing is a timing for updating the allowable error. In the present embodiment, the passage of a predetermined period such as one month is adopted as the updating condition, and the updating condition is set in advance in the HDD 104. Note that, an updating condition is not limited to the updating condition of the present embodiment. As another example, obtainment of a predetermined number of pieces, such as 30 pieces, of comparison data (detection object data) with respect to which a non-normal state was not detected may be set as the updating condition.

If the CPU 101 determines that the current timing is the update timing (Yes in S311), the CPU 101 advances the processing to S300. If the CPU 101 determines that the current timing is not the update timing (No in S311), the CPU 101 advances the processing to S305. Thereby, the allowable error is updated every time a certain amount of normal-time data is added. Therefore, in the processing performed thereafter, the updated reference data can be used. Thus, the information processing apparatus 100 can automatically update the allowable error to an appropriate value.

Next, the relations between indices of the allowable error and the divergence value and a non-normal state that is to be detected are described referring to FIG. 5A to FIG. 8B. FIG. 5A to FIG. 5C are explanatory diagrams for describing the correlation coefficient. It is assumed that reference data 500 is generated from normal-time data as illustrated in FIG. 5A. In contrast, as illustrated in FIG. 5B, non-normal-time data 501 that exhibits a data shape that is different from the shape of the reference data is sometimes measured. For example, a case is conceivable in which the external device 110 contacts a cooled object and is temporarily cooled rapidly.

FIG. 5C is a view illustrating divergence values of respective indices obtained with respect to the non-normal-time data 501. As illustrated in FIG. 5C, it is found that although the values of the non-normal-time data 501 and the values of the normal-time data cannot be effectively separated with respect to the total sum of differences and the inter-data distance, the values of the non-normal-time data 501 and the values of the normal-time data can be effectively separated with respect to the correlation coefficient. In other words, as described in the foregoing, it is found that the correlation coefficient is suitable for detecting a non-normal state in which the data shape changes.

FIG. 6A to FIG. 6C are explanatory diagrams for describing the total sum of differences. It is assumed that reference data 600 is generated from normal-time data as illustrated in FIG. 6A. In contrast, as illustrated in FIG. 6B, non-normal-time data 601 that, although having a shape that resembles the shape of the reference data, exhibits values that are higher overall in comparison to the reference data 600 is sometimes measured. For example, a case is conceivable in which the temperature rises due to abnormal operation of the external device 110 or an air conditioning failure.

FIG. 6C is a view illustrating divergence values of respective indices obtained with respect to the detection object data 601. As illustrated in FIG. 6C, it is found that although the values of the non-normal-time data 601 and the values of the normal-time data cannot be effectively separated with respect to the correlation coefficient and the inter-data distance, it is possible to effectively separate the values of the non-normal-time data 601 and the normal-time data with respect to the total sum of differences. In other words, as described in the foregoing, it is found that the total sum of differences is suitable for detecting a non-normal state in which the overall data significantly changes in the positive or negative direction.

FIG. 7A to FIG. 7C are explanatory diagrams for describing the inter-data distance. It is assumed that reference data 700 is generated from normal-time data as illustrated in FIG. 7A. In contrast, as illustrated in FIG. 7B, non-normal-time data 701 for which the amplitude is small in comparison to the reference data 700 is sometimes measured. For example, a case is conceivable in which air conditioning of the external device 110 stopped.

FIG. 7C is a view illustrating divergence values of respective indices obtained with respect to the detection object data 701. As illustrated in FIG. 7C, it is found that although the values of the non-normal-time data 701 and the values of the normal-time data cannot be effectively separated with respect to the correlation coefficient and the total sum of differences, it is possible to effectively separate the values of the non-normal-time data 701 and the normal-time data with respect to the inter-data distance. In other words, as described in the foregoing, it is found that the inter-data distance is suitable for detecting a non-normal state in which the amplitude of data changes.

Figure 8A:
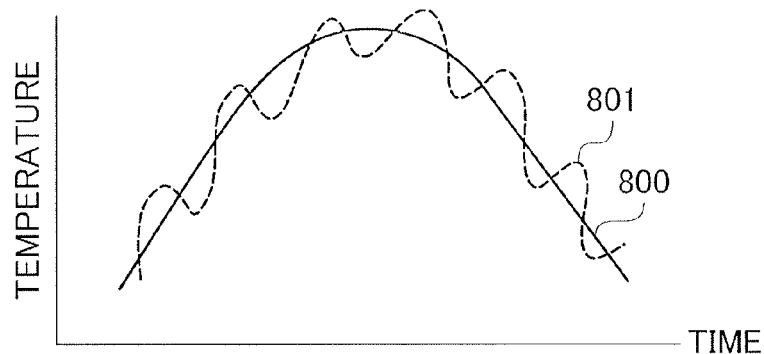
FIG. 8A is an explanatory diagram for describing a case of using a combination of three indices which are a correlation coefficient, a total sum of differences and an inter-data distance.
Figure 8B:
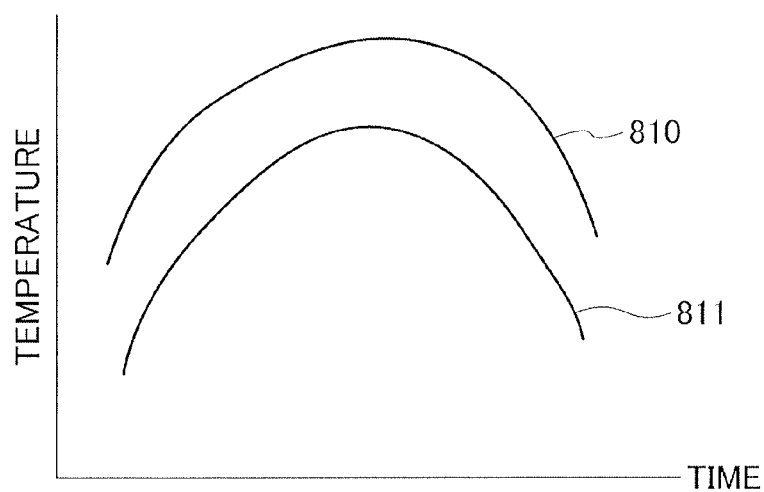
FIG. 8B is an explanatory diagram for describing a case of using a combination of three indices which are a correlation coefficient, a total sum of differences and an inter-data distance.

FIG. 8A and FIG. 8B are explanatory diagrams for describing a case of using a combination of the foregoing three indices, namely, the correlation coefficient, the total sum of differences and the inter-data distance. As illustrated in FIG. 8A, non-normal-time data 801 exhibiting slight temperature changes with respect to reference data 800 is measured in some cases. For example, a case is conceivable in which a hole is formed in a sealed space, and wind enters. Further, with respect to waveform data (time series data) for the sound of a motor, a case is conceivable in which a bolt of the motor is loosened and generates noise. In such cases, as the ranges of the respective allowable errors of the correlation coefficient, the sum of differences and the inter-data distance, the correlation coefficient is set in a range close to 1, the total sum of differences is set in a range close to zero, and the inter-data distance is set in a range of values equal to or greater than a predetermined value. The detection unit 206 may detect a case where at least one of the three indices of divergence values exceeds the allowable error range as a non-normal state.

Further, as illustrated in FIG. 8B, non-normal-time data 811 that exhibits lower values overall relative to reference data 810 is sometimes measured. For example, a case is conceivable in which, in a sealed space, the output setting for air-conditioning is changed, or in which there is a failure of a cooling device or the like. Further, with respect to waveform data for the sound of a motor, a case is conceivable in which the output of the motor is weakened by a decrease in the power supply due to a contact failure at the power source or the like. In such cases, as the ranges of the respective allowable errors of the correlation coefficient, the sum of differences and the inter-data distance, the correlation coefficient is set in a range close to 1, the total sum of differences is set in a range of values equal to or less than a predetermined value, and the inter-data distance is set in a range of values equal to or greater than a predetermined value. The detection unit 206 may detect a case where at least one of the three indices of divergence values exceeds the allowable error range as a non-normal state. As described above, it is sufficient that at least one of the correlation coefficient, the total sum of differences and the inter-data distance is included as an index that is utilized when detecting a non-normal state.

Figure 9:
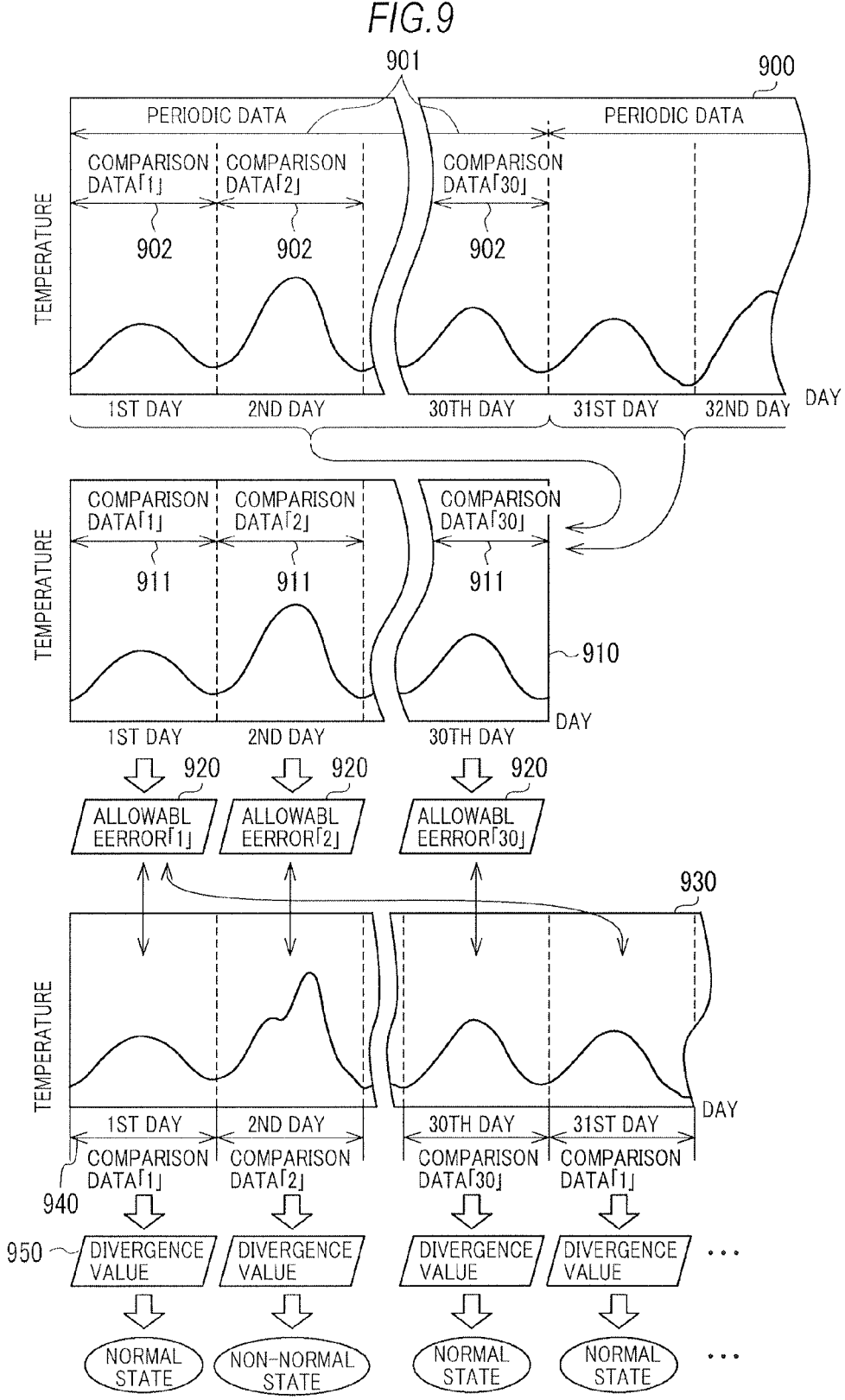
FIG. 9 is an explanatory diagram for describing a case where a period unit and a comparison unit are different.

Next, a case where a period unit and a comparison unit are different will be described referring to FIG. 9. It is assumed that normal-time data 900 is time series data of temperature changes for several tens of days. As illustrated in FIG. 9, the normal-time data 900 is divided into periodic data 901 on a 30-days basis. In addition, the periodic data 901 is divided into 30 pieces of comparison data 902 (comparison data "1", "2" . . . "30") on a single-day basis.

In this case, as illustrated in FIG. 9, reference data 910 on a 30-days basis is generated which corresponds to the periodic data. On the other hand, an allowable error is generated for each piece of comparison data 911 in single-day units of the reference data 910. In other words, as illustrated in FIG. 9, allowable errors 920 are generated based on the comparison data 911 of the reference data, and the comparison data 902 of the periodic data 901 that corresponds to the comparison data 911 of the reference data. In the example in FIG. 9, an allowable error "1" is calculated based on a plurality of pieces of comparison data respectively included in the plurality of pieces of periodic data 901, and the comparison data "1" of the reference data 910. Similarly, allowable errors to "30" are generated based on comparison data "1" to "30" of the reference data 910, respectively.

Note that, the comparison data of the reference data is not particularly limited, and a configuration may be adopted in which, after reference data is temporarily generated in periodic data units, the reference data is then divided into comparison data units, or a configuration may be adopted that generates reference data for each comparison data unit.

In addition, as illustrated in FIG. 9, detection object data 930 is divided into comparison data 940 in single-day units in correspondence with the comparison data 902. Divergence values 950 are then calculated based on the comparison data 940 of the detection object data 930 and the corresponding comparison data 911 of the reference data 910. In the example in FIG. 9, a divergence value "1" is calculated based on comparison data "1" of the detection object data 930 and comparison data "1" of the reference data 910. Similarly, divergence values "1" to "30" are calculated based on comparison data "1" to "30" of the detection object data 930, respectively. Further, each time a divergence value is calculated, a detection is performed to determine whether or not there is a non-normal state.

For example, in a case where 30 days is adopted as a period unit, and 30 days is also adopted as a comparison unit, detection for a non-normal state cannot be performed unless 30 days have passed. In contrast, in a case where 30 days is adopted as a period unit, and one day is adopted as a comparison unit, each time that one day passes, detection for a non-normal state can be performed based on the detection object data for the relevant one day.

As described above, the information processing apparatus 100 according to the present embodiment can detect a non-normal state that is different from a normal state by data analysis, without performing complicated processing. For example, in a case where a configuration is adopted that detects for a non-normal state by performing a comparison with a threshold value, it is difficult to set an appropriate value as a threshold value, and it has been necessary for the user to set the threshold value. In contrast, in the information processing apparatus 100 according to the present embodiment, a non-normal state can be detected automatically without determining a threshold value. Further, because the information processing apparatus 100 according to the present embodiment generates reference data based on time series data at a normal time that was obtained in the past, and detects for a non-normal state by comparing with the reference data, a non-normal state can be detected with high accuracy.

In addition, since the information processing apparatus 100 according to the present embodiment can generate appropriate reference data by taking into consideration the periodicity of time series data at a normal time that was obtained in the past, a non-normal state can be detected with higher accuracy.

Note that the non-normal-state detection processing described above referring to FIG. 3 may be realized by cooperation between a plurality of apparatuses that are connected through a network. In other words, the non-normal-state detection processing may be realized by an information processing system having a plurality of apparatuses.

Second Embodiment

Figure 10:
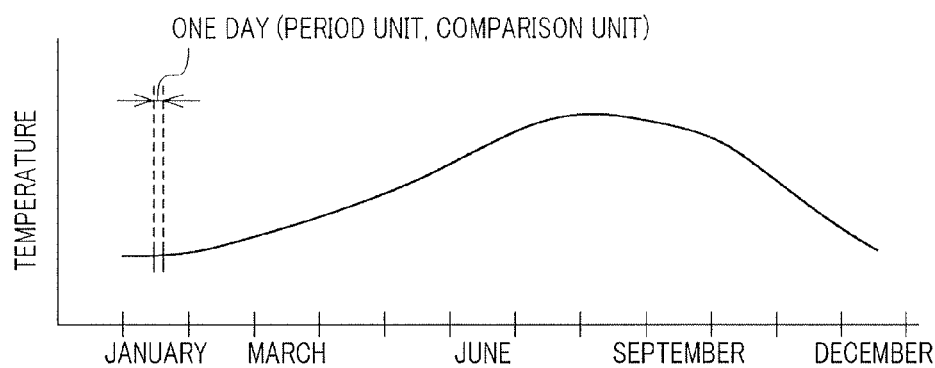
FIG. 10 is a view illustrating an example of time series data.
Figure 11:
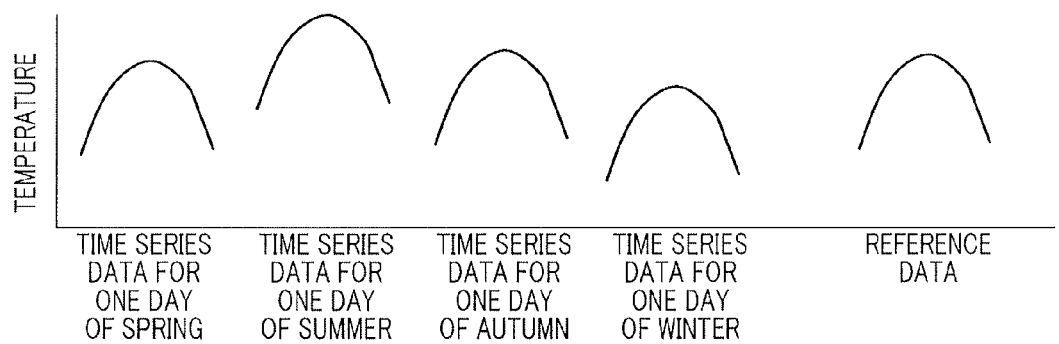
FIG. 11 is a view illustrating an example of trends in temperature changes by season and reference data.

Next, an information processing apparatus 100 according to a second embodiment will be described. First, time series data that is adopted as the processing object of the information processing apparatus 100 according to the second embodiment will be described. The time series data that is adopted as the processing object is, as illustrated in FIG. 10, time series data of temperature changes that are influenced by the outside air temperature in Japan. Note that, as illustrated in FIG. 11, when the time series data illustrated in FIG. 10 is seen in single-day units, the time series data shows temperature changes having differing tendencies in accordance with the four seasons of spring, summer, autumn and winter. In a case where a period unit and a comparison unit are set as one day and reference data is generated with respect to time series data of this kind, average data for the entire year is generated as reference data. Therefore, as illustrated in FIG. 11, there is the problem that, in comparison to the time series data for single days that was measured in spring or autumn, there is a large difference with respect to the reference data in the time series data for single days that was measured in summer or winter.

Although it is also conceivable to set the period unit as one year and to set the comparison unit as one day, in such a case a long time period of 10 years or the like would be required in order to obtain reference data, and that situation is not preferable. Contrarily, the information processing apparatus 100 according to the second embodiment sets four kinds of reference data in accordance with the four seasons while setting the period unit and the comparison unit to one day. The information processing apparatus 100, for example, generates reference data in single-day units for spring based on normal-time data for each day that was measured from April to June. Similarly, the information processing apparatus 100 generates reference data for summer, autumn and winter based on normal-time data for each day of the periods July to September, October to December, and January to March, respectively. The information processing apparatus 100 then selects and uses the appropriate reference data to be referred to in accordance with the month in which the detection object data was measured.

Note that, the information processing apparatus 100 may perform switching of reference data in accordance with a user operation, or as another example, may automatically perform switching of reference data based on a value of the detection object data. The latter example will now be described in detail. For example, depending on the year, the trend of temperature changes with respect to single days may sometimes transition to a trend of the next season earlier (or later) than an average year. Contrarily, the information processing apparatus 100 determines whether or not the trend of the detection object data transitioned to the next season. Specifically, the information processing apparatus 100 calculates a divergence value of the detection object data in day units. Further, the information processing apparatus 100 detects a non-normal state in accordance with whether or not the divergence value is within the range of an allowable error, and checks whether or not the divergence value satisfies a transition condition.

Figure 12:
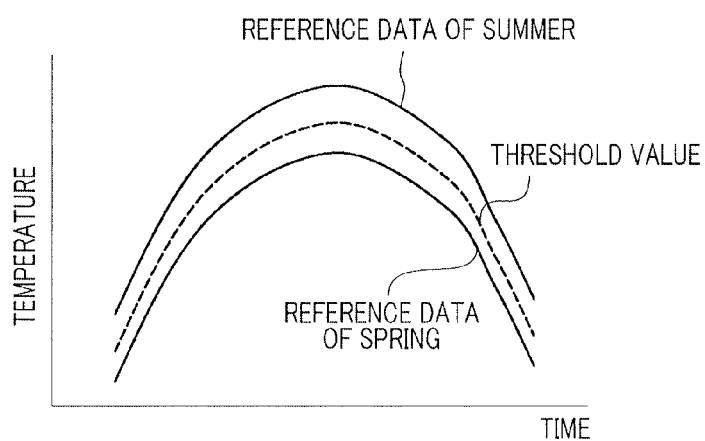
FIG. 12 is an explanatory diagram for describing a transition condition.

Note that, the transition condition is a condition relating to a divergence value that is used for switching the reference data, and is set in advance in the HDD 104 or the like. The transition condition is different from the allowable error range. For example, when the season changes from spring to summer, the overall temperature throughout a single day rises. Contrarily, a condition that a correlation coefficient obtained as a divergence value between the detection object data and the reference data is equal to or greater than a threshold value (close to 1), and the total sum of differences is equal to or greater than a threshold value is set in advance as a transition condition for transitioning from spring to summer. In addition, the information processing apparatus 100, for example, may automatically set a threshold value of the total sum of differences based on the reference data for spring and the reference data for summer. Specifically, as illustrated in FIG. 12, the information processing apparatus 100 may set an average value of the reference data for spring and the reference data for summer as a threshold value.

Further, for example, in a case where days in which the correlation coefficient is equal to or greater than a threshold value that is set in advance as a value close to 1 and the total sum of differences exhibits a value that is equal to or greater than a threshold value that was automatically set have continued for a predetermined number of days (for example, 10 days), the information processing apparatus 100 determines that the trend of the detection object data transitioned to the next season. Further, if the information processing apparatus 100 determines that the trend of the detection object data transitions to the next season, the information processing apparatus 100 automatically switches the reference data to the reference data of the next season (switching processing). Note that, the remaining configuration and processing of the information processing apparatus 100 according to the second embodiment is the same as the configuration and processing of the information processing apparatus 100 according to the first embodiment.

Although an abnormality of equipment at a factory or a plant, or of a server at a data center or the like can typically be detected according to the present invention, the application range of the present invention is not limited to a factory or plant or a data center. It is needless to say that the present invention can also be applied to all kinds of situations such as to various kinds of equipment (elevators, escalators, air-conditioning, conveyors, cranes or the like) in buildings or warehouses or the like, electrical appliances in ordinary households, other electronic devices, household appliances, and furthermore to transportation infrastructure such as vehicles and trains. In addition, the data adopted as a measurement object is not limited to data for temperature or sound, and various kinds of data such as data for electric current, voltage, vibration, pressure, acceleration, and light may be a measurement object, and it is self-evident that the data to be taken as a measurement object is not particularly limited.

Other Embodiments

The present invention is also realized by executing the following processing. In other words, software (a program)

that realizes the functions of the above-described embodiments is supplied to a system or an apparatus via a network or various types of storage media. The processing is processing in which a computer (or a CPU, an MPU, or the like) of the system or apparatus reads out and executes the program.

According to the respective embodiments described above, a non-normal state that is different from a normal state can be detected by data analysis, without performing complicated processing.

Although preferred embodiments of the present invention are described in detail above, the present invention is not limited to these specific embodiments, and various modifications and changes are possible within the scope of the gist of the present invention described in the claims.

The invention claimed is:

1. An information processing apparatus, comprising:
   a memory; and
   a processor coupled to the memory and configured to:
   divide time series data measured at a normal time into first comparison data in a comparison unit;
   generate reference data of time series data in the comparison unit based on the first comparison data;
   calculate an allowable error based on correlation coefficients between each of pieces of the first comparison data and the reference data;
   divide time series data for detection into second comparison data in the comparison unit;
   calculate correlation coefficients between each of pieces of the second comparison data and the reference data;
   detect a non-normal state in accordance with whether or not the correlation coefficients between each of pieces of the second comparison data and the reference data are within a range of the allowable error;
   when a non-normal state is detected, generate a notification indicating that a non-normal state was detected;
   when a non-normal state is not detected, the time series data for detection is added to and recorded as the time series data measured at the normal time;
   update the reference data based on the time series data measured at the normal time; and
   when the reference data is updated, update the allowable error using the reference data after updating.

2. The information processing apparatus according to claim 1, wherein the processor is further configured to:
   divide the time series data measured at the normal time into periodic data in a periodic unit, the periodic unit is a longer unit than the comparison unit;
   generate the reference data for each of pieces of the first comparison data in the periodic unit; and
   calculate the allowable error based on the first comparison data and the reference data corresponding to the first comparison data.

3. The information processing apparatus according to claim 2, wherein the processor is further configured to:
   determine the period unit based on the time series data measured at the normal time.

4. The information processing apparatus according to claim 2, wherein the processor is further configured to:
   in a case where the time series data measured at the normal time includes a plurality of pieces of periodic data having differing trends to each other, generate a plurality of pieces of reference data corresponding to respective pieces of periodic data; and
   switch the reference data in a case where the correlation coefficients between each of pieces of the second comparison data and the reference data satisfies a predetermined transition condition.

5. The information processing apparatus according to claim 1, wherein the processor is further configured to:
   calculate a smallest value of correlation coefficients between each of pieces of the first comparison data and the reference data as the allowable error.

6. The information processing apparatus according to claim 1, wherein the processor is further configured to:
   calculate correlation coefficients between each of pieces of the second comparison data and the updated reference data.

7. An information processing apparatus, comprising:
   a memory; and
   a processor coupled to the memory and configured to:
   divide time series data measured at a normal time into first comparison data in a comparison unit;
   generate reference data of time series data in the comparison unit based on the first comparison data;
   calculate an allowable error based on total sums of differences between each of pieces of the first comparison data and the reference data;
   divide time series data for detection into second comparison data in the comparison unit;
   calculate total sums of differences between each of pieces of the second comparison data and the reference data;
   detect a non-normal state in accordance with whether or not the total sums of differences between each of pieces of the second comparison data and the reference data are within a range of the allowable error;
   when a non-normal state is detected, generate a notification indicating that a non-normal state was detected;
   when a non-normal state is not detected, the time series data for detection is added to and recorded as the time series data measured at the normal time;
   update the reference data based on the time series data measured at the normal time; and
   when the reference data is updated, update the allowable error using the reference data after updating.

8. The information processing apparatus according to claim 7, wherein the processor is further configured to:
   calculate a range from a smallest value to a maximum value of the total sums of differences between each of pieces of the first comparison data and the reference data as the allowable error.

9. An information processing apparatus, comprising:
   a memory; and
   a processor coupled to the memory and configured to:
   divide time series data measured at a normal time into first comparison data in a comparison unit;
   generate reference data of time series data in the comparison unit based on the first comparison data;
   calculate an allowable error based on inter-data distances between each of pieces of the first comparison data and the reference data;
   divide time series data for detection into second comparison data in the comparison unit;
   calculate inter-data distances between each of pieces of the second comparison data and the reference data;
   detect a non-normal state in accordance with whether or not the inter-data distances between each of pieces of the second comparison data and the reference data are within a range of the allowable error;
   when a non-normal state is detected, generate a notification indicating that a non-normal state was detected;

when a non-normal state is not detected, the time series data for detection is added to and recorded as the time series data measured at the normal time;

update the reference data based on the time series data measured at the normal time; and when the reference data is updated, update the allowable error using the reference data after updating.

10. The information processing apparatus according to claim 9, wherein the processor is further configured to:

calculate a maximum value of inter-data distances between each of pieces of the first comparison data and the reference data as the allowable error.

11. An information processing method that is a method that an information processing apparatus executes, comprising steps of:

dividing time series data measured at a normal time into first comparison data in a comparison unit;

generating reference data of time series data in the comparison unit based on the first comparison data;

calculating an allowable error based on correlation coefficients between each of pieces of the first comparison data and the reference data;

dividing time series data for detection into second comparison data in the comparison unit;

calculating correlation coefficients between each of pieces of the second comparison data and the reference data;

detecting a non-normal state in accordance with whether or not the correlation coefficients between each of pieces of the second comparison data and the reference data are within a range of the allowable error;

when a non-normal state is detected, generating a notification indicating that a non-normal state was detected;

when a non-normal state is not detected, the time series data for detection is added to and recorded as the time series data measured at the normal time;

updating the reference data based on the time series data measured at the normal time; and when the reference data is updated, updating the allowable error using the reference data after updating.

12. An information processing method that is a method that an information processing apparatus executes, comprising steps of:

dividing time series data measured at a normal time into first comparison data in a comparison unit;

generating reference data of time series data in the comparison unit based on the first comparison data;

calculating an allowable error based on total sums of differences between each of pieces of the first comparison data and the reference data;

dividing time series data for detection into second comparison data in the comparison unit;

calculating total sums of differences between each of pieces of the second comparison data and the reference data;

detecting a non-normal state in accordance with whether or not the total sums of differences between each of pieces of the second comparison data and the reference data are within a range of the allowable error;

when a non-normal state is detected, generating a notification indicating that a non-normal state was detected;

when a non-normal state is not detected, the time series data for detection is added to and recorded as the time series data measured at the normal time;

updating the reference data based on the time series data measured at the normal time; and when the reference data is updated, updating the allowable error using the reference data after updating.

13. An information processing method that is a method that an information processing apparatus executes, comprising steps of:

dividing time series data measured at a normal time into first comparison data in a comparison unit;

generating reference data of time series data in the comparison unit based on the first comparison data;

calculating an allowable error based on inter-data distances between each of pieces of the first comparison data and the reference data;

dividing time series data for detection into second comparison data in the comparison unit;

calculating inter-data distances between each of pieces of the second comparison data and the reference data;

detecting a non-normal state in accordance with whether or not the inter-data distances between each of pieces of the second comparison data and the reference data are within a range of the allowable error;

when a non-normal state is detected, generating a notification indicating that a non-normal state was detected;

when a non-normal state is not detected, the time series data for detection is added to and recorded as the time series data measured at the normal time;

updating the reference data based on the time series data measured at the normal time; and when the reference data is updated, updating the allowable error using the reference data after updating.

14. A non-transitory computer readable recording medium with a program causing a computer to execute:

a first divider configured to divide time series data measured at a normal time into first comparison data in a comparison unit;

a reference data generator configured to generate reference data of time series data in the comparison unit based on the first comparison data;

an allowable error calculator configured to calculate an allowable error based on correlation coefficients between each of pieces of the first comparison data and the reference data;

a second divider configured to divide time series data for detection into second comparison data in the comparison unit;

a correlation coefficient calculator configured to calculate correlation coefficients between each of pieces of the second comparison data and the reference data;

a detector configured to detect a non-normal state in accordance with whether or not the correlation coefficients between each of pieces of the second comparison data and the reference data are within a range of the allowable error;

when a non-normal state is detected, a display configured to display a notification indicating that a non-normal state was detected;

when a non-normal state is not detected, an adder configured to add the time series data for detection, and a storage unit configured to record as the time series data measured at the normal time;

an updater configured to update the reference data based on the time series data measured at the normal time; and when the reference data is updated, the updater configured to update the allowable error using the reference data after updating.

15. A non-transitory computer readable recording medium with a program causing a computer to execute:

a first divider configured to divide time series data measured at a normal time into first comparison data in a comparison unit;

a reference data generator configured to generate reference data of time series data in the comparison unit based on the first comparison data;

an allowable error calculator configured to calculate an allowable error based on total sums of differences between each of pieces of the first comparison data and the reference data;

a second divider configured to divide time series data for detection into second comparison data in the comparison unit;

a total sums calculator configured to calculate total sums of differences between each of pieces of the second comparison data and the reference data;

a detector configured to detect a non-normal state in accordance with whether or not the total sums of differences between each of pieces of the second comparison data and the reference data are within a range of the allowable error;

when a non-normal state is detected, a display configured to display a notification indicating that a non-normal state was detected;

when a non-normal state is not detected, an adder configured to add the time series data for detection, and a storage unit configured to record as the time series data measured at the normal time;

an updater configured to update the reference data based on the time series data measured at the normal time; and when the reference data is updated, the updater configured to update the allowable error using the reference data after updating.

16. A non-transitory computer readable recording medium with a program causing a computer to execute:

a first divider configured to divide time series data measured at a normal time into first comparison data in a comparison unit;

a reference data generator configured to generate reference data of time series data in the comparison unit based on the first comparison data;

an allowable error calculator configured to calculate an allowable error based on inter-data distances between each of pieces of the first comparison data and the reference data;

a second divider configured to divide time series data for detection into second comparison data in the comparison unit;

an inter-data calculator configured to calculate inter-data distances between each of pieces of the second comparison data and the reference data;

a detector configured to detect a non-normal state in accordance with whether or not the inter-data distances between each of pieces of the second comparison data and the reference data are within a range of the allowable error;

when a non-normal state is detected, a display configured to display a notification indicating that a non-normal state was detected;

when a non-normal state is not detected, an adder configured to add the time series data for detection, and a storage unit configured to record as the time series data measured at the normal time;

an updater configured to update the reference data based on the time series data measured at the normal time; and when the reference data is updated, the updater configured to update the allowable error using the reference data after updating.

* * * * *